Feb. 8, 1938.  D. J. CAMPBELL  2,107,747
CAMSHAFT
Filed Oct. 28, 1935
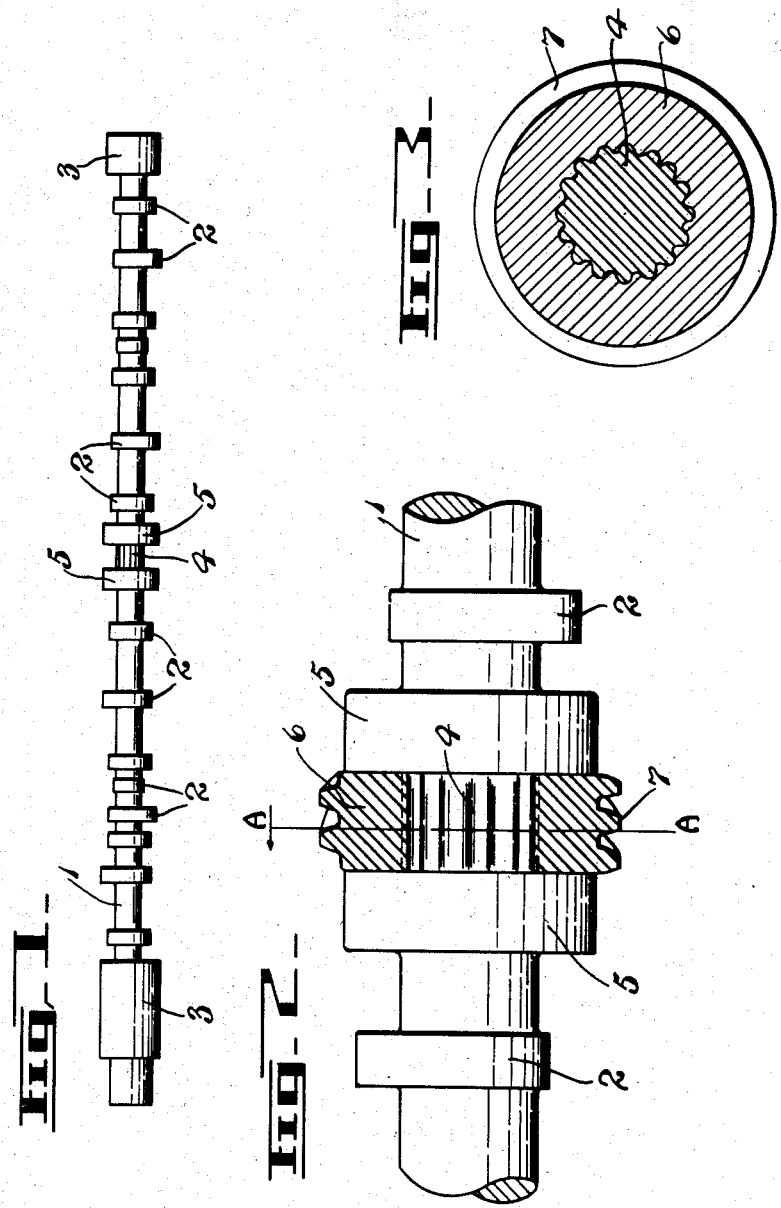
INVENTOR
DONALD J. CAMPBELL
BY
Liverance and Van Antwerp
ATTORNEY Patented Feb. 8, 1938

2,107,747

UNITED STATES PATENT OFFICE 2,107,747

CAMSHAFT

Donald J. Campbell, Spring Lake Township, Ottawa County, Mich., assignor to Campbell, Wyant & Cannon Foundry Company, Muskegon Heights, Mich., a corporation of Michigan Application October 28, 1935, Serial No. 46,983

1 Claim. (Cl. 74—567)

This invention relates to camshafts for poppet valve engines and particularly to such shafts as are employed in internal combustion engines for lifting the intake and exhaust valves from their seats to admit air or gaseous fluid to the combustion space of the engine and permit the products of combustion to be expelled therefrom.

Camshafts used in poppet valve engines, such as the internal combustion engine, are elongated cylindrical members having a plurality of transversely projecting cams, in spaced relation between the bearings at the ends of the shaft and frequently bearings intermediate thereof. These camshafts are usually made by a forging method from a billet of steel with the cams and journal bearings forged integral with the elongated portion. They are expensive to make because of the forging die cost and the large amount of surplus metal to be cut away in machining the shaft to close dimensions. Other camshafts have been made by casting from an alloyed iron. These cast shafts are cheaper than the forged camshaft to produce in the finished shaft and are equally as good in many respects. In both of these cam shafts the metal is of the same texture throughout with the same wearing qualities in the accessory driving gear as in the bearings and cam portions of the shaft resulting in a gear of more rapid wear to the teeth of the gear than to the bearings and the cams.

In the present invention the shaft with its journals and cams are cast integrally from alloyed iron suitable therefor and the accessory driving gear of a metal particularly suited for gears cast onto the shaft at a position provided, of which the periphery preferably has a plurality of corrugations or splines, although it may be square or any other suitable shape.

The objects of invention are to provide a cam shaft of cheap construction whereof the elongated cylindrical shaft portion with its journals and cams will be of cast metal such as a suitable alloyed cast iron, and the accessory driving gear will be of another cast metal more suitable for withstanding the severe usage subjected to such gears and a cam shaft that will be cheaper to produce than the forged steel shaft.

The above mentioned objects, as well as others not at this time enumerated, will be apparent from a perusal of the description taken in connection with the accompanying drawing in which:

Fig. 1 is a elevation of the cam shaft casting before the accessory driving gear has been cast thereon.

Fig. 2 is an enlarged fragmentary view of an intermediate portion of the camshaft showing the accessory driving gear in section cast on the shaft and after the gear teeth have been cut.

Fig. 3 is a transverse sectional view of the shaft and accessory driving gear taken on line A—A of Fig. 2.

Like reference characters refer to like parts throughout the several views of the drawing.

The shaft designated as 1 is an elongated cast cylindrical member throughout the length of which are spaced apart transversely projecting cams 2 integrally cast with the shaft and at each end of the shaft are bearings 3 whereby the shaft is supported in suitable bearings of the engine. At an intermediate portion of the shaft's length is a corrugated or splined section 4 between bearings 5. The corrugated section 4 is in axial alignment with the shaft member 1. Cams 2 and bearings 3 and 5 are produced integral with the shaft portion by casting in any usual manner of producing such castings. A mold is prepared to the form of the shaft mentioned and the accessory driving gear blank with gates and risers leading to the gear blank cavity. The previously cast shaft is placed in the mold and suitable molten gear metal is poured through the gate into the gear blank cavity to fill the same and cast the gear blank onto the corrugated section 4 of the shaft, the accessory driving gear blank, which is thereafter machined to required dimensions and the gear teeth cut in its periphery, the bearings having been previously machined to their required dimensions.

The metal from which the shaft is cast may be of any suitable ferrous metal. It may or may not contain alloying metals such as chromium, molybdenum, nickel or other alloys. The accessory driving gear is cast onto the shaft of any metal suitable for gears and when cast upon the shaft as described is as though formed integrally therewith.

Having described the present invention, it is claimed:

An elongated cast cam shaft or the like having spaced bearings of larger diameter than the shaft and cams integral with said shaft, two of said bearings on the shaft being spaced apart a short distance, a relatively thin cast gear located around the shaft between said bearings, the material of said cast gear being of a different composition than that of the shaft, and interengaging means on the gear and shaft, as and for the purpose specified.

DONALD J. CAMPBELL.